United States Patent [19]
Gravenstein et al.

[11] Patent Number: 5,893,928
[45] Date of Patent: Apr. 13, 1999

[54] DATA MOVEMENT APPARATUS AND METHOD

[75] Inventors: Martin Gerard Gravenstein; Silvia Elizabeth Jaeckel, both of Colorado Springs, Colo.

[73] Assignee: Ford Motor Company, Dearborn, Mich.

[21] Appl. No.: 08/786,463

[22] Filed: Jan. 21, 1997

[51] Int. Cl.[6] .................................................. G06F 12/10
[52] U.S. Cl. ........................................ 711/203; 711/221
[58] Field of Search ............................. 711/1, 202, 203, 711/206, 221

[56] References Cited

U.S. PATENT DOCUMENTS

| | | | |
|---|---|---|---|
| 4,586,131 | 4/1986 | Caudel et al. | 395/562 |
| 4,853,849 | 8/1989 | Bain, Jr. et al. | 711/202 |
| 5,019,969 | 5/1991 | Izumisawa et al. | 395/800.04 |
| 5,396,610 | 3/1995 | Yoshida et al. | 711/150 |
| 5,446,865 | 8/1995 | Corcoran et al. | 395/500 |
| 5,564,031 | 10/1996 | Amerson et al. | 711/209 |
| 5,696,957 | 12/1997 | Yamaura et al. | 395/569 |

*Primary Examiner*—Eddie P. Chan
*Assistant Examiner*—Kevin L. Ellis
*Attorney, Agent, or Firm*—Allan J. Lippa, Esq.

[57] ABSTRACT

A data movement apparatus (10) and method therefor include a register file (14) for storing data in a plurality of addressable locations. A register decoder (18) is connected to the register file (14) to modify addresses to access desired data. During move commands, data is not physically moved in the register file (14), but the register decoder (18) modifies a variable upon receiving the move command to correlate the new logical address to the physical location.

11 Claims, 2 Drawing Sheets

DATA MOVEMENT APPARATUS AND METHOD

BACKGROUND OF THE INVENTION

1. Field of the Invention

The invention relates generally to digital processors, and more specifically, to the efficient movement and the storage of data in registers of the processors.

2. Description of the Related Art

There has been much development in computers and processors to speed up the processing of data and optimize use of data path cycles. Many microprocessor applications require the movement of data from a source register resource to a destination register resource. This has generally been accomplished by the implementation of a move instruction or by the use of an add instruction applied to the source instructor with a constant zero second operand. Both of these methods consume the data path during the instruction cycle to accomplish the move.

FIG. 1 illustrates a prior art data path resource which may be used for data movement between registers. The figure shows a register file containing some number of register data locations and which has two ports for reading operands A and B, and a port for writing the destination W. Addresses for all these ports are driven by the control unit based on the decoding of the current instruction execution. For data movement to occur between two registers in the register file, an instruction is issued to select the source register as operand A and either operand B is ignored or expected to be a constant zero value. The destination is selected for the write port and the data movement is accomplished by the source passing through the ALU unmodified and written to the destination via the register file write port.

Other prior art has manipulated data and registers in a variety of methods. U.S. Pat. No. 5,019,969 issued May 28, 1991 in the name of Izumisawa et al. discloses a computer system for directly transferring vector elements from register to register using a single instruction. The system uses a dedicated hardware unit and data path which provides the data movement in parallel with any subsequent operations which the main ALU may perform. This dedicated hardware will consume an execution cycle for each data moved which will result in the variable time delay latency from the time the move instruction is issued until the time it is completed. This means that subsequent instructions which access the data can not be executed until the move is complete.

U.S. Pat. No. 4,586,131 issued Apr. 29, 1986 in the name of Caudel et al. discloses a microcomputer having data movement circuits for within-memory shift of data words. The data movement is accomplished by actual physical movement of the data storage from one circuit to another, and the multiple data shift would take an execution cycle per data moved.

U.S. Pat. No. 5,396,610 issued Mar. 7, 1995 in the name of Yoshida et al. discloses a register address specifying circuit for simultaneously accessing two registers when executing the instruction for transferring a plurality of registered contents.

U.S. Pat. No. 5,446,865 issued Aug. 29, 1995 in the name of Corcoran et al. discloses a processor adapted for use as a coprocessor for sharing memory with more than one processor.

SUMMARY OF THE INVENTION

The present invention is a data movement apparatus which includes a register file having a plurality of data locations associated with different register addresses for storing a plurality of data in the data locations, and a register decoder connected to the register file for receiving a logical address representative of a logical location of selected data and storing a modification variable to modify the logical address by the modification variable to produce the register address to the register file representative of the physical data location of the selected data.

The present invention also includes a method of data movement which includes the steps of storing selected data in a register file at a selected data location accessed by a register address, receiving a move command to move the data to a different data location accessed by a different logical address, storing a modification variable representative of the change between the register address and the different logical address, receiving an access command to access the selected data by the different logical address, and modifying the different logical address by the modification variable to produce the register address to obtain the selected data.

An advantage of the present invention is to provide a data movement apparatus which does not consume the data path to execute and can thus be executed concurrently with another operation which does require use of the data path.

Another advantage of the present invention is that the data is not physically moved from within the register but rather the addressing thereof is modified by the register decoder.

BRIEF DESCRIPTION OF THE DRAWINGS

The above object and advantages of the invention will be more clearly understood by reading an example of an embodiment in which the invention is used to advantage with reference to the attached drawings wherein.

DESCRIPTION OF THE PREFERRED EMBODIMENT(S)

Figure 1:
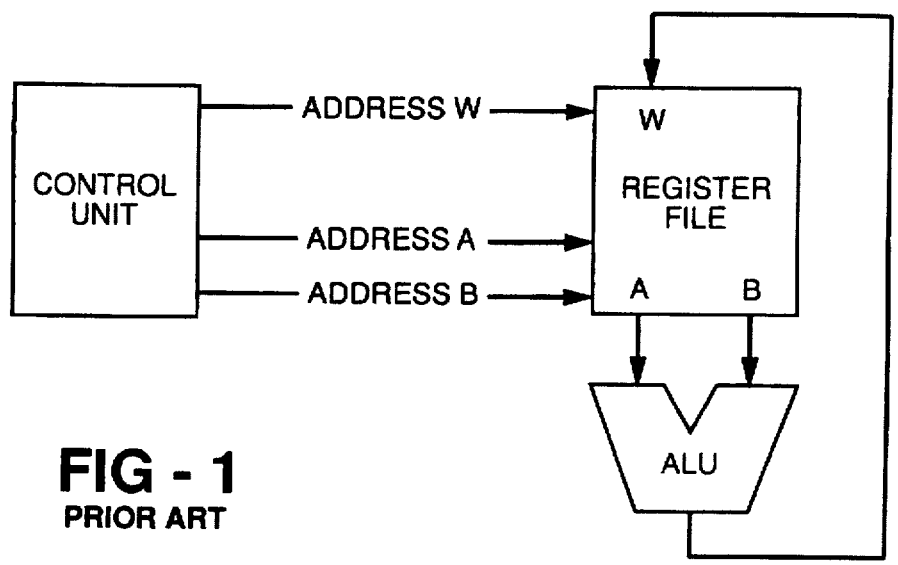
FIG. 1 illustrates a block diagram of the prior art.
Figure 2:
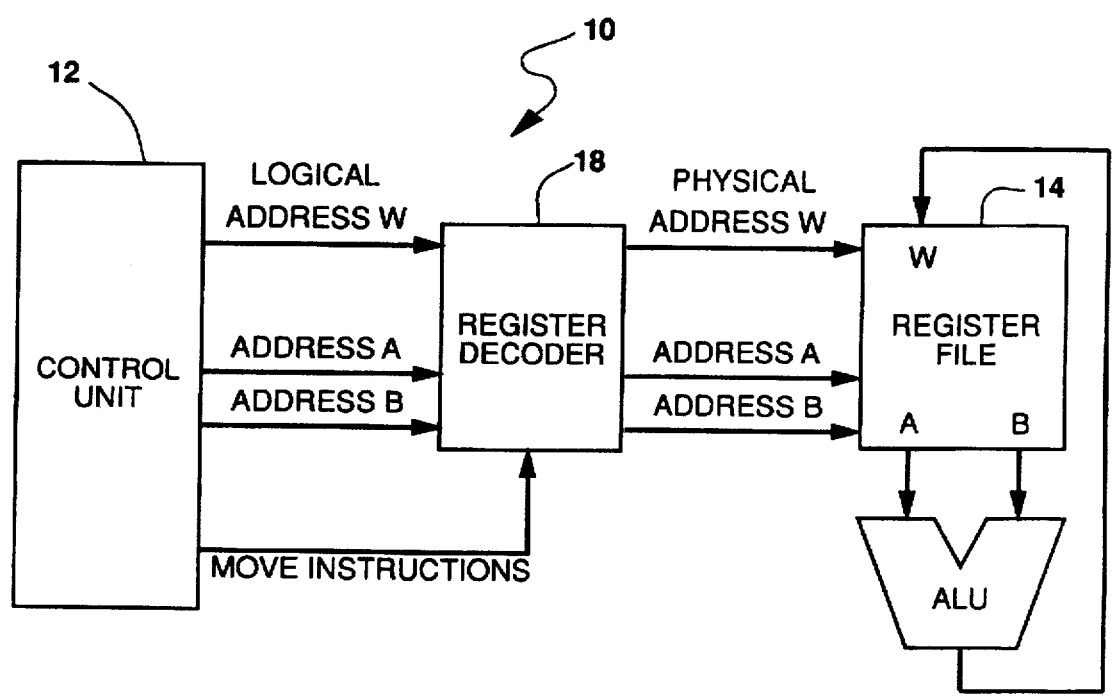
FIG. 2 is a block diagram illustrating the data movement apparatus of the present invention.

Data movement apparatus 10 is shown in FIG. 2. Data movement apparatus 10 is used in connection with a processor or computer for processing data and commands. The data movement apparatus 10 processes digital signals and allows for the quick and efficient movement of data within a register without physically moving the data to avoid using a data path cycle.

Data movement apparatus 10 includes control unit 12 operating under program control for providing commands to execute data and other instructions. Control unit 12 may be a commonly available processor or microcomputer.

Data movement apparatus 10 also includes register file 14 having a plurality of data locations associated with different register addresses for storing a plurality of data in the data locations. Register file 14 may also be a FIFO (first in first out) memory, or a random access memory (RAM) which stores data at addressable locations. Both memory types are applicable to the present invention, and will also be described herein. It is to be appreciated that other types of memory may be used.

Data movement apparatus 10 also includes register decoder 18 connected to register file 14 for receiving a data address representative of a logical location of selected data, and to store a modification variable to modify the data address by the modification variable to produce the register address to register file 14 representative of the physical data location of the selected data. Register decoder 18 may include a single modification variable or may include a state machine for mapping of several addresses, as will be subsequently described. Register decoder 18 intercepts any move commands from control unit 12 to change the modification variable for register file 14, without actually physically moving the data. Control unit 12 operates under program control to produce a move command to move selected data to a new logical address from an old logical address. Register decoder 18 receives the move command and produces the modification variable so that upon receipt of the new logical address, the register decoder 18 produces the old logical address or physical address to register file 14. The logical address is used to indicate the address of the stored data as used by program control in control unit 12, whereas the physical address is used to indicate the actual address in register file 14 which generally remains unchanged.

The move command typically includes a source and destination address within its command. In register file 14, as FIFO memory, only the destination address need be provided. However, if register file 14 is RAM memory, then the destination and source are supplied. In either case, register decoder 18 intercepts all move commands to effectively accomplish the move within decoder 18 by changing addresses, rather than physically moving the data within register file 14 which takes up the data path. Two examples will be addressed herein, though it is to be understood that the invention can be applied to other memory applications.

In the case of FIFO register file 14, a series of data may be moved at one time by merely changing one variable. As an example, three register positions 1, 2, 3 are in register file 14 (addresses numbered the same). Location 1 contains the most recent data wherein location 3 contains the oldest data. The modification variable of register decoder 18 initially stores the position of location 1 in the register file 14, and each subsequent location is in series thereafter. Assume data A is placed in register 3 and data B is placed in register 2. The move instruction states that data A is to be moved to location 1 instead of its present location 3. In this case, the register decoder 18 will store an offset value of 2. When the control unit 12 thereafter requests the data A by logical address location 1, the modification variable of a value 2 will be added to the logical address in order to obtain physical address 3, the physical location of data A.

In the case of a state machine as register decoder 18 and RAM as register file 14, each physical address of register file 14 will be mapped to a logical address used by control unit 12. If data is moved by control unit 12, the mapping in the register decoder 18 will correlate the new logical address with the physical location in register file 14. In this case, the move command includes both the source and destination.

Figure 3:
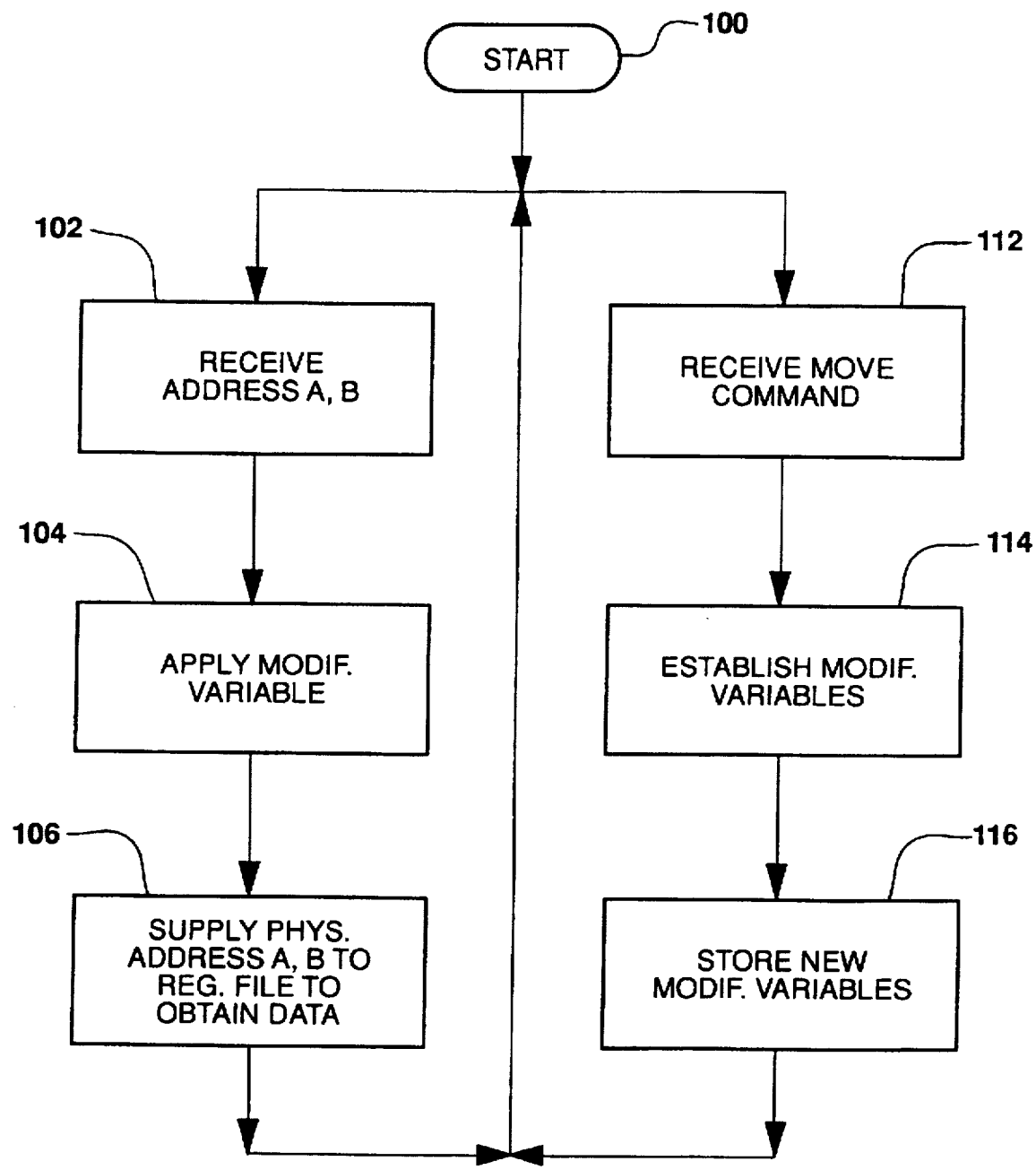
FIG. 3 is a flow chart utilized by the data movement apparatus of the present invention.

FIG. 3 illustrates the flow chart of the data movement apparatus 10. The flow chart starts at block 100, and branches to either block 102 or block 112 depending upon the command received. If the control unit 12 merely supplies an address with a command other than a move command, the address is received by the register decoder 18 in block 102. Register decoder 18 thereafter applies the modification variable in block 104 and supplies the physical address A, B to register file 14 in block 106. In the case that register decoder 18 receives a move command from the control unit 12, the register decoder 18 receives a source and destination in block 112 and thereafter establishes any modification variable(s) relating the source and destination addresses in block 114 and stores same in register decoder 18 in block 116.

The present invention also includes a method of moving data. The method includes the steps of storing selected data in register file 14 at a selected data location accessed by a physical register address. The method also includes receiving a move command to move the selected data to a different data location accessed by a different logical address, storing a modification variable representative of the change between the physical register address and the different logical address, receiving an access command to access the selected data by the different logical address, and modifying the different logical address by the modification variable to produce the physical register address to obtain the selected data. The method also includes the step of storing a plurality of data in a FIFO memory (first in first out), and storing a single modification variable for operation on all the addresses. The method also includes storing a plurality of modification variables so that each register address may have a unique modification variable associated therewith for addressing RAM as register file 14.

This concludes a description of an example of operation in which the invention claimed herein is used to advantage. Those skilled in the art will bring to mind many modifications and alterations to the example prescribed herein without departing from the spirit and scope of the invention. Accordingly, it is intended that the invention be limited only by the following claims:

What is claimed is:

1. A data movement apparatus comprising:

a register file (14) comprising a plurality of physical data locations (16) associated with different register addresses for storing a plurality of data in said physical data locations;

a register decoder (18) connected to said register file (14) for storing a modification variable and for receiving a logical address representative of a logical data location of selected data and for producing said register address representative of said physical data location of the selected data based on said modification variable, whereby said modification variable is changed to reorder selected data from said physical data location to different logical data location by modifying said logical address associated with the different logical data location with said modification variable to obtain said register address associated with the said physical data locations so that the selected data is logically reordered within the apparatus by changing said modification variable without physically moving the selected data in the data location.

2. A data movement apparatus as set forth in claim 1 further including a control unit (12) producing said logical address to access selected data, said register decoder (18) connected to receive said logical address to access said register file (14).

3. A data movement apparatus as set forth in claim 2 wherein said control unit (12) operating under program control produces a move command to move selected data to a different data location accessed by a different logical address, said register decoder (18) receiving said move command and producing said modification variable representative of the change between the register address and the different logical address so that upon receipt of said different logical address said register decoder (18) modifies the different logical address by the modification variable to produce a register address representing the physical location of data in said register file (14).

4. A data movement apparatus as set forth in claim 3 wherein said register decoder (18) is a state machine having a plurality of modification variables, each mapping said logical addresses with said register address representing the physical date location.

5. A data movement apparatus as set forth in claim 3 wherein said register decoder (18) includes a single modification variable to provide an offset between said logical address and said register address representing the physical date location.

6. A data movement apparatus as set forth in claim 5 wherein said register file (14) is a first-in-first-out memory.

7. A data movement apparatus comprising:
- a register file (14) comprising a plurality of data locations associated with different register addresses for storing selected data in selected data locations;
- a control unit (12) operating under program control to produce a move command to move selected data to a different data location accessed by a different logical address.
- a register decoder (18) connected to said register file (14) for storing a modification variable representative of the change between the register address and the different logical address, and for receiving the different logical address representative of a logical location of selected data, and modifying the different logical address by the modification variable to produce said register address to said register file (14) representative of the physical data location of the selected data to obtain the selected data
- whereby the selected data is logically reordered within the apparatus by changing said modification variable without physically moving the selected data in the data locations.

8. A method of data movement including the steps of:

storing selected data in a register file (14) at a selected data location accessed by a register address.

receiving a move command to move the selected data to a different data location accessed by a different logical address.

storing a modification variable representative of the change between the register address and the different logical address.

receiving an access command to access the selected data by the different logical address.

modifying the different logical address by the modification variable to produce the register address to obtain the selected data.

9. A method as set forth in claim 8 further including the step of storing a plurality of modification variables so that each address may have a unique modification variable.

10. A method as set forth in claim 8 further including the step of storing a plurality of data in a FIFO memory (first-in-first-out).

11. A method as set forth in claim 10 further including the step of storing a single modification variable for operation on all the addresses.

\* \* \* \* \*